Patented Dec. 20, 1932

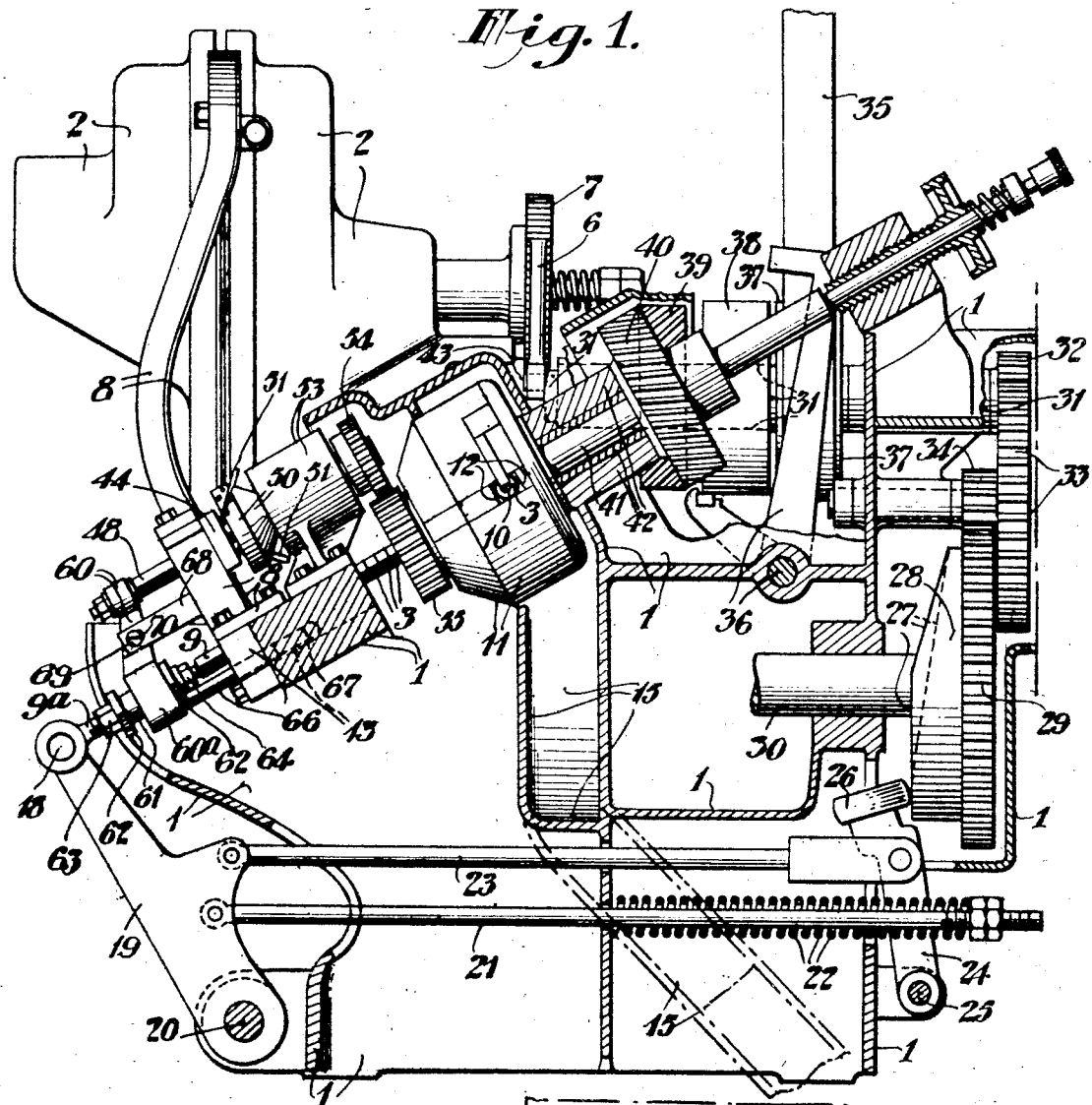

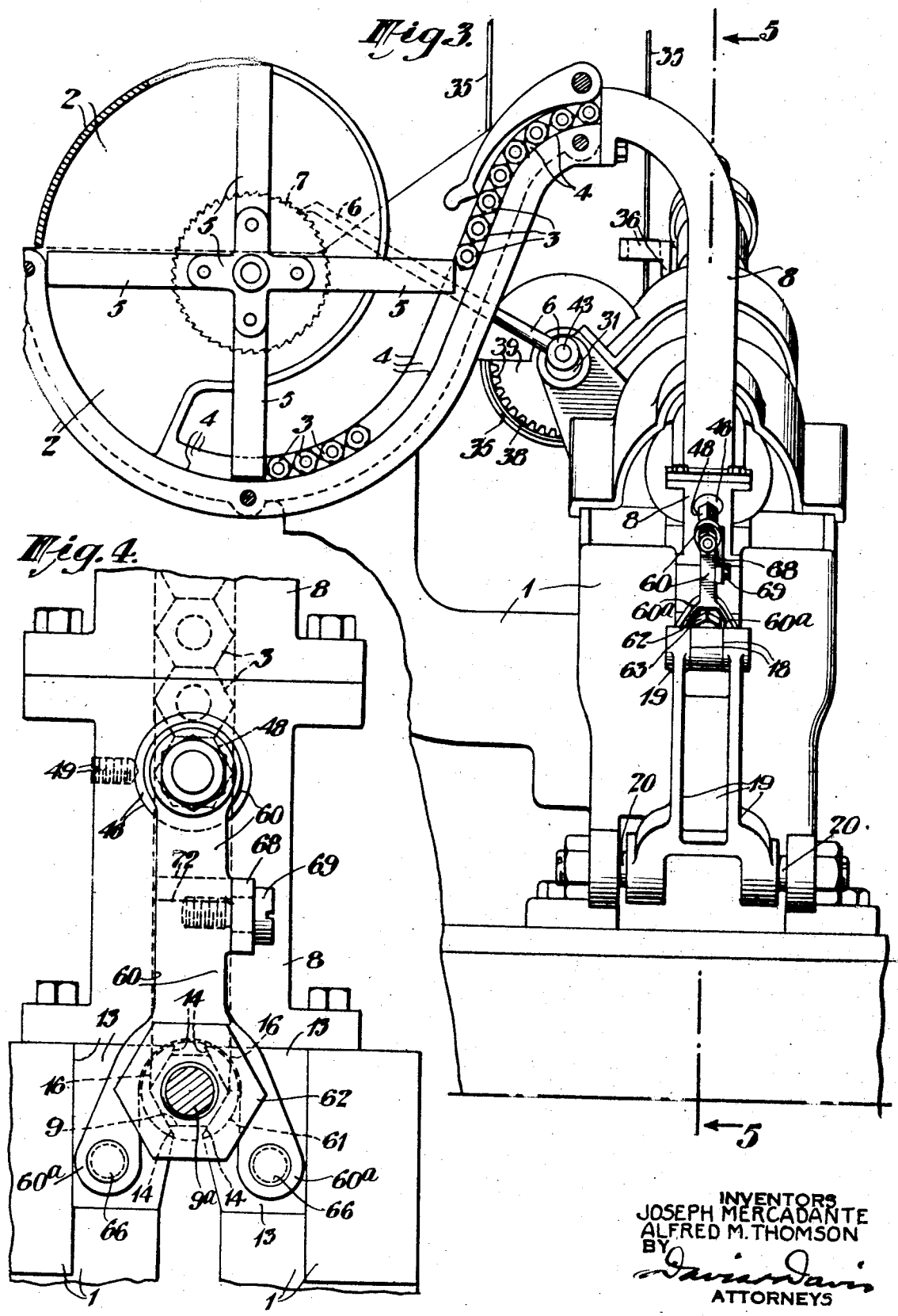

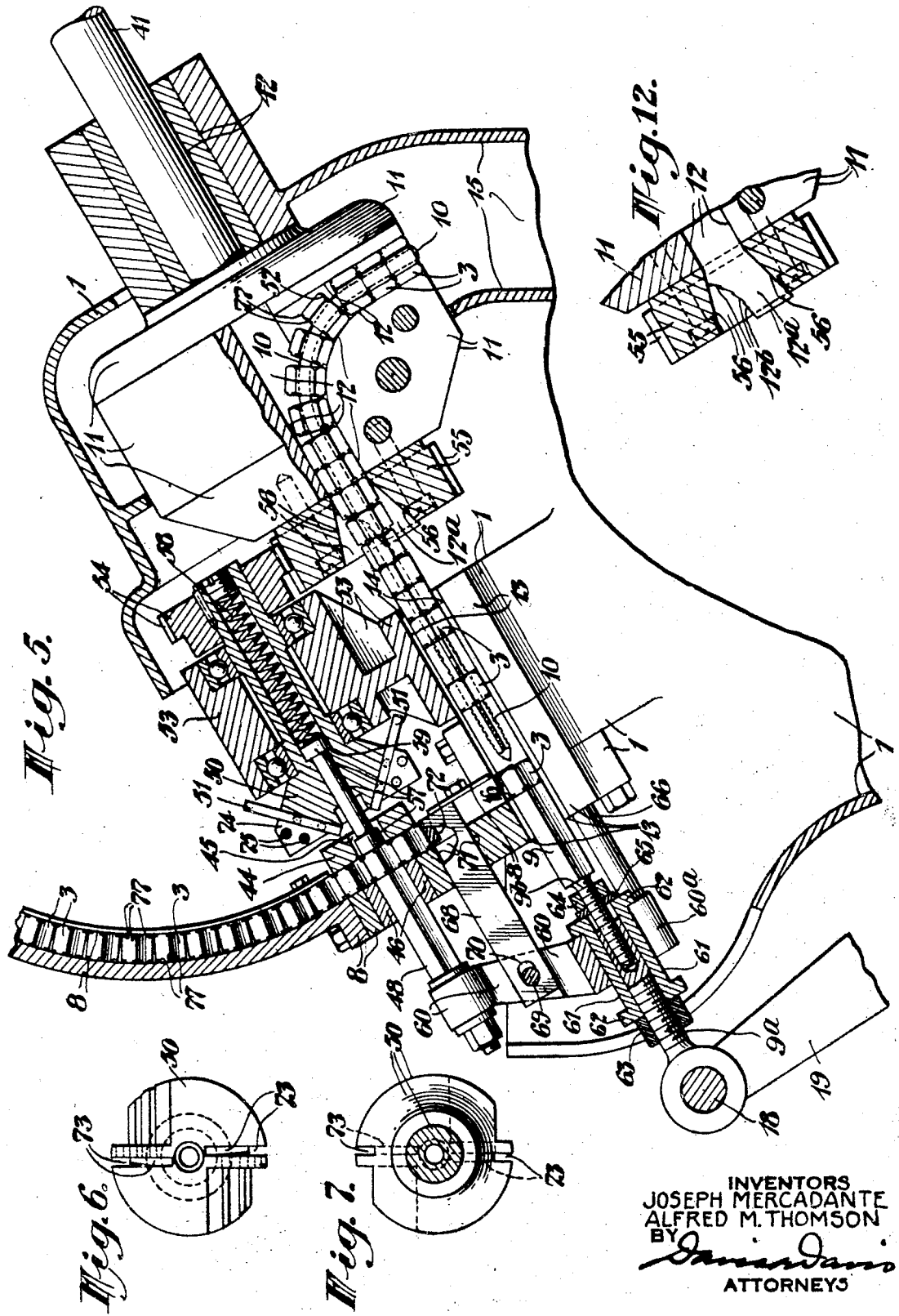

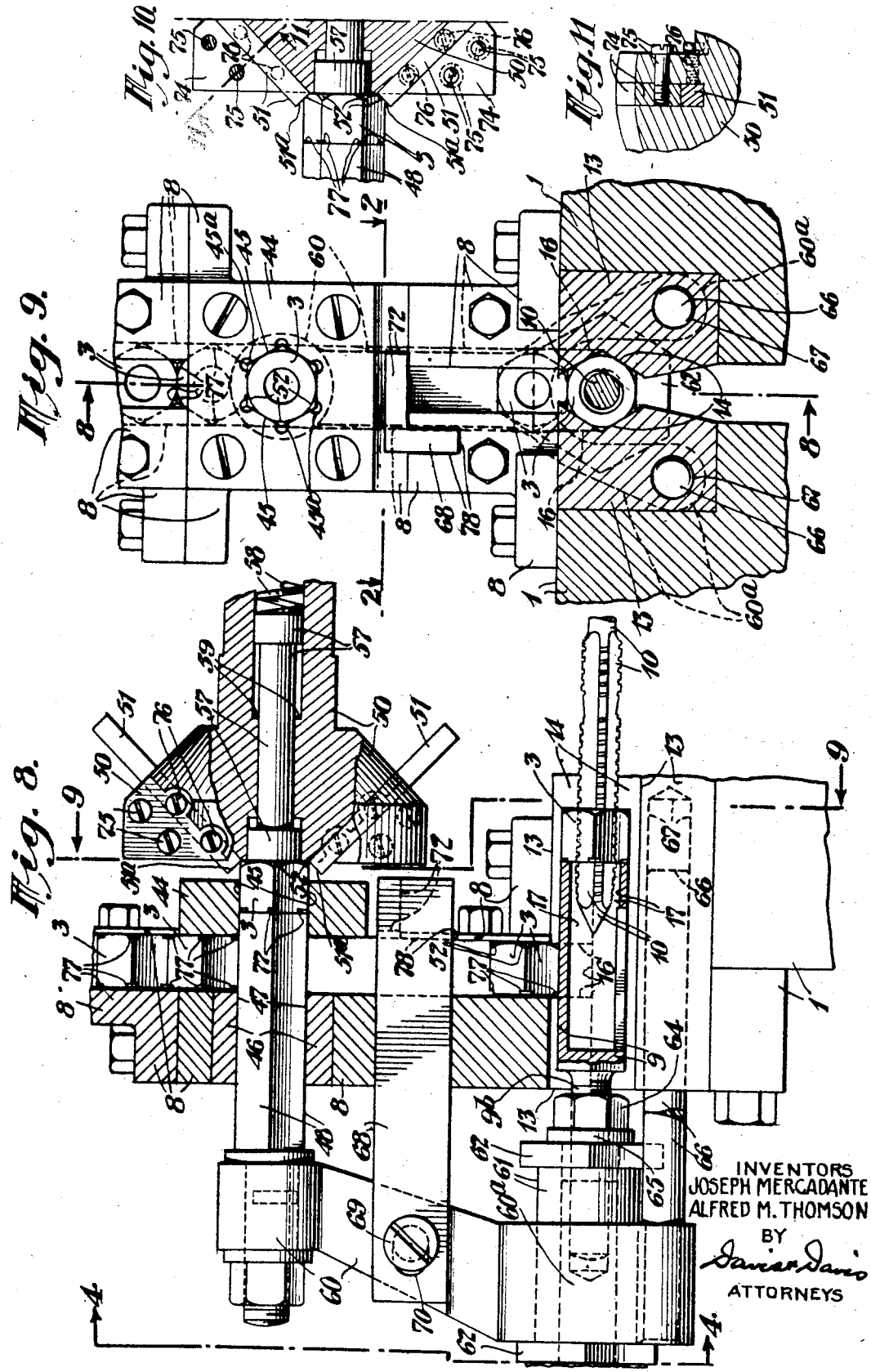

1,891,721

UNITED STATES PATENT OFFICE

JOSEPH MERCADANTE, OF LARCHMONT, NEW YORK, AND ALFRED MORRIS THOMSON, OF NEWARK, NEW JERSEY, ASSIGNORS TO DARDELET THREADLOCK CORPORATION, OF NEW YORK, N. Y., A CORPORATION OF DELAWARE

MACHINE FOR FINISHING AND TAPPING NUT BLANKS

Application filed October 23, 1930. Serial No. 490,620.

This invention relates to improvements in machines for finishing and tapping nut blanks, and its principal objects are to provide an efficient automatic machine of increased output capacity for converting perforated nut blanks with ends of similar form into finished nuts with opposite ends of readily distinguishable forms which are all tapped from the same one of said differentiated ends; to provide an automatic nut tapping machine, of the type wherein nut blanks are fed into a chute from a hopper and pushed one at a time by a pusher or starter from the chute onto one end of a continuously running tap from the opposite end of which the tapped nuts are discharged, with mechanism controlled from said pusher for presenting nut blanks one at a time to an end-finishing device during their progress through the chute from hopper to tap; to provide an improved automatic mechanism for chamfering nut blanks; to provide improved automatic mechanism of high output capacity for successively chamfering and threading nut blanks; to provide automatic blank chamfering means readily applicable to existing commercial automatic nut tapping machines and particularly to such machines of the type having a bent shank tap for threading the blanks; to provide an automatic nut chamfering and threading machine wherein blanks are successively positioned for chamfering by a constantly rotating cutter and pushed or started upon a constantly rotating tap by two plungers having a common vibrating actuator; and to provide efficient means for presenting one end of successive nut blanks in a conveying chute to a rotary end-finishing cutter rotating at one side of the chute and restoring the end-finished blanks to the chute.

The drawings illustrate a well known automatic nut tapping machine of the bent-shank tap type modified in accordance with the present invention, but the invention is not to be understood as limited in its application to machines having such a tapping mechanism or to the specific construction shown, the construction illustrated being merely the preferred embodiment of the invention.

In the drawings, Fig. 1 is a side elevation of the machine partly in vertical section, with the blank displacing and tapping starting plungers fully retracted;

Fig. 2 is a sectional view on the line 2—2 of Fig. 9;

Fig. 3 is an end view of the machine looking from the left of the machine as viewed in Fig. 1, the near half of the hopper being removed;

Fig. 4 is a sectional view on the line 4—4 of Fig. 8;

Fig. 5 is a fragmentary vertical sectional view of the machine on the line 5—5 of Fig. 3, with the blank displacing and tapping starting plungers fully retracted as in Fig. 1;

Figs. 6 and 7 are detail views showing opposite end faces of the cutter blade holding or larger end portion of the end-finishing cutter with the blades removed;

Fig. 8 is a sectional view on the line 8—8 of Fig. 9, with the blank displacing and tapping starting plungers fully advanced or at the opposite limit of their movement from the position shown in Figs. 1 and 5;

Fig. 9 is a sectional view on the line 9—9 of Fig. 8 with the moving parts positioned as in Fig. 8;

Fig. 10 is a fragmentary sectional view of the end-finishing cutter turned relatively to a blank from the position shown in Fig. 8 and showing in connection with Fig. 8 how the cutting edges of the cutter blades chamfer the corners only of a blank;

Fig. 11 is a fragmentary sectional view of the end-finishing cutter on the line 11—11 of Fig. 10; and Fig. 12 is a detail sectional view of the tap chuck and the attached gear with the tap removed to show clearly the nut positioner.

A sufficient description of the known features of the machine illustrated will now be given to enable those skilled in the art to fully understand the present invention and its advantages when the novel features of the machine and their novel relations with the old features are subsequently described.

The machine comprises a suitable framework 1 supporting the automatic blank tapping and blank feeding devices.

The blank feeding means is constructed as follows: A blank supply container or hopper 2, into which pierced nut blanks 3 are dumped, is provided with the usual curved discharge trough or channel 4 of such depth and width as to receive a row of nut blanks and guide them to move edgewise one behind the other. The nut blanks are agitated in the container by a four-vaned revolving agitator and feeder 5 rotated step by step by a pawl 6 acting on ratchet 7 fixed to the axle of the agitator. The tips of the vanes of feeder 5 engage in channel 4 to force the blanks edgewise up the channel into the upper end of the feed chute or conveyor 8 down which chute the blanks move to the tapping mechanism under the influence of gravity. The nut passage of the chute is of such cross section as to guide the blanks to move edgewise in a fixed path determined by the chute to the tapping mechanism.

The tapping mechanism is of the bent-shank tap type and comprises the tapping starting or blank pushing plunger 9, the bent-shank tap 10, the tap supporting and driving chuck 11 having the nut guiding passage 12 receiving the elbow-like end of the bent shank of the tap, and the stationary nut blank guiding means 13 into which the toothed or threaded body portion of the tap extends. Guiding means 13 comprises a pair of parallel bars rigidly held to the framework 1 with opposed V-shaped channels 14 for guiding a blank dropped edgewise thereinto from the lower discharge end of the chute to move endwise to the entering end of the tap with its aperture or bore registering with the tap, and then along the threaded body of the tap while held against rotation by the guiding means. After passing off the guiding means the tapped nuts travel along the tap shank, passing through the nut guiding passage 12 of the tap chuck in which they are held against rotation, and pass off the end of the tap shank out of the discharge end of passage 12 into a nut-discharge chute 15 formed in the framework, which conveys them to a suitable receptacle.

The tap does not extend under the discharge end of feed chute 8, but the nut blank guiding and holding means 13 extends under the lower end of the chute in position to receive a single blank edgewise therein and arrest the blank with its opposite ends centered with respect to the entering end of the tap and the head of the tapping starting plunger 9. In the construction shown, which is designed to handle hexagonal nut blanks, it will be obvious that the edgewise moving blank will be arrested with one flat edge face or side of the blank facing directly downward, since the upper portion only of the channeled face of each guide bar 13 is recessed as shown at 16 to permit the blank to drop edgewise only into the guideway formed by the two opposed channels 14, the downwardly converging walls of said channels below recesses 16 acting to arrest descent of the blank in said registered position with said registered blank holding any blank directly thereabove from leaving the chute and being engaged by the plunger head.

The reciprocable plunger 9 conforms in cross sectional outline with the blank and is slidably guided in the guideway from a fully retracted position shown in Figs. 1 and 5, in which its head is at the opposite side of chute 8 and recess 16 from the entering end of the tap, to a fully advanced position shown in Figs. 2 and 8, in which it extends across the lower end of the chute, with one flat side uppermost to engage and support the lowermost flat side of any nut directly thereabove in the lower end of the chute, and is partly telescoped upon the tap, the head of the plunger having an axial chamber 17 adapted to receive the entering end of the tap so that the plunger may push a blank fully onto the tap. The plunger is pivoted at 18 to the upper end of a rock arm 19 that is hinged at its lower end at 20 to the framework 1. Arm 19 is rocked to advance the plunger by a link 21 connected thereto and guided in the frame and urged to the right as viewed in Fig. 1 by a coil spring 22, and said plunger is retracted by a link 23 connecting arm 19 and a parallel rock arm 24 which is hinged at 25 on the frame and carries a roller 26 running on the annular edge 27 of a cam 28 which determines the throw of the plunger.

A main power shaft 31 journalled in the framework 1 affords a source of power for various working parts of the machine. Cam 28 and a gear 29 are fixed on a shaft 30 journalled in the framework, gear 29 being continuously driven from the main power shaft 31 of the machine through a train of gears 32, 33 and 34. A driving belt 35 driven by any suitable means may be shifted by a belt shipper 36 from an idle pulley 37 to a fixed driving pulley 38 on the main power shaft to start the machine. The tap chuck is continuously driven in one direction from the main power shaft 31 through a spiral gear 39 fixed on shaft 31 and meshing with a spiral gear 40 fixed on a shaft 41 which is journalled in a suitable bearing 42 in the framework 1. The chuck, at the end opposite to that at which the tap projects, is fixed on one end of shaft 41 at the opposite end of bearing 42 from that at which gear 40 is located, these parts being arranged, as shown, to hold the chuck against axial or endwise movement for rotation in a fixed plane. The driving pawl 6 for the agitator and feeder 5 is driven from the main power shaft, being pivoted on a stud 43 fixed into one end of the main power shaft 31 eccentrically of the shaft axis.

In the known machine the chute extends from the hopper to the guiding means 13 and the blanks are not acted on except by the tapping mechanism. It is desirable to produce in automatic machines, nuts having opposite ends of distinctive form, and that such nuts should preferably all be tapped from the same end, and, in the case of Dardelet self-locking nuts which are not effective if screwed on a bolt wrong-end first, it is particularly desirable to produce nuts having opposite ends of different form to distinguish the top from the bottom of the nuts. In order to produce such nuts in an automatic machine the nuts must all be tapped from one and the same of said differentiated ends. By the present invention the foregoing desired ends may be accomplished efficiently, and by the construction shown an efficient, known automatic tapping machine may be readily modified or converted into a machine capable of accomplishing said results. The means by which this is accomplished will now be described.

A stationary nut blank holder and guide block 44 is fastened to the chute 8 between the upper and lower ends of the chute at that side of the chute toward which the entering end of the tap extends, said block having a central guide passage 45 therethrough extending perpendicular to the nut blank passage of the chute at that point and opening at one end into the nut passage. Directly opposite block 44 a plunger guide sleeve 46, having a guide passage 47 for a nut blank displacing plunger 48 registering with guide passage 45, is mounted in the opposite wall of the chute 8, being held in place by a set screw 49. The guide passages 45 and 47, which are of the same size and shape, are shaped to slidably receive the plunger 48, passage 45 being also adapted to slidably receive a nut blank 3, the cross-section of the plunger preferably corresponding with that of the nut blanks 3, which in the drawings are hexagonal blanks.

When the plunger is moved across the chute to displace a blank registered with the guide passage 45 into guide block 44, the lowermost flat side of the next higher blank in the chute is adapted to rest on the uppermost flat side of the plunger 48. Blank displacing plunger 48 is reciprocable between the limits shown in Figs. 5 and 8 by means hereinafter described so as to leave the nut blank passage open for downward passage of blanks when plunger 48 is fully retracted as in Figs. 1 and 5, and to extend across the nut blank passage of the chute into the inner end of passage 45 of block 44 far enough to project a nut blank partly out of the outer end of passage 45, as shown in Fig. 8, to position the projecting end of the nut blank for action thereon of a suitable rotary end-finishing cutting tool 50. Various forms of end-finishing tools may be employed for giving to the projected end of the blank a distinctive form readily distinguishable from its opposite end.

In the preferred construction shown, the tool 50 is a rotary metal-turning tool of the inserted blade type, having cutting blades 51 with cutting edges 51ᵃ inclined to the tool axis and arranged to chamfer the corners of the projected end of the nut blank as shown more clearly in Figs. 8 and 10. The cutting ends of the blades project from the flat end face of the tool which is opposed to the outer end of block 44 and clear the flats of the blank, as indicated in Fig. 8, but chamfer the corners as shown at 52 as the blades pass the corners, as clearly indicated in Fig. 10. Tool 50 is so rotatably held in a support 53 bolted to the framework 1 as to revolve in a fixed path about an axis coincident with the center of the blank held in guide block 44, i. e. the axis of the tool is coincident with the longitudinal center line of plunger 48 and guide passages 45 and 47. Tool 50 is rotated continuously in one direction by a gear 54 fixed on one end of the tool and meshing with a gear 55 fixed on that end of the tap chuck 11 from which the tap projects. Guide passage 45 of block 44 may be relieved as at 45ᵃ, along the lines where its flat walls would normally join, to prevent binding of the corners of the nut blanks in the guide passage.

The chute 8 is preferably inclined to the horizontal at the point of temporary endwise displacement of the blanks, as shown in Figs. 1 and 5, the tap axis and that of the tool 50 being parallel and inclined to the horizontal and extending perpendicular to the path of the edgewise travel of the blanks at the points where the blanks are moved endwise to the tool and tap. A nut blank displaced by plunger 48 may thus return under the influence of gravity to the chute as the plunger 48 is retracted. To insure such return, however, a double-headed blank restoring plunger 57 is mounted in the tool 50, axially of the tool, to slide endwise. The blank engaging head of plunger 57 is movable by a coiled spring 58, pressing on its other head, to a limit determined by engagement of the latter head with an internal shoulder 59 of the tool, at which limit the blank engaging face of the blank engaging head of plunger 57 is flush with the inner face of block 44, which block constitutes part of one wall of the chute 8, as shown in Fig. 5. Plunger 57 thus yieldably opposes displacement of a blank by plunger 48, but its spring 58 is weaker than spring 22 so that plunger 57 may be forced backward when plunger 48 is advanced toward the tool. The blank engaging head of plunger 57 is smaller than the end of the blank but larger than the blank bore, and is adapted to be telescoped in the adjacent end of the tool, the throw of plunger 48 being preferably such as to move the projected end of the displaced blank against the adjacent end face of the tool, as shown in Figs. 8 and 10.

Plunger 48 is rigidly held in an operating slide 60 having a forked lower end the pendant arms 60ª of which straddle the barrel of an axially adjustable sleeve 61 having two integral end flanges or collars 62 engageable alternately with said arms to form a lost-motion driving connection between tapping starting plunger 9 and blank displacing plunger 48, the latter plunger having a shorter throw than the plunger 9 which actuates plunger 48 through one cycle for each cycle of plunger 9 which in turn is moved through one cycle for each complete revolution of cam 28. The stem of plunger 9 comprises two relatively adjustable sections 9ª and 9ᵇ threaded one into the other as usual, but in the present machine the sleeve 61 is mounted on section 9ª to actuate plunger 48 and is slidable endwise on section 9ª for adjustment to regulate the throw of plunger 48, being locked in adjusted position by lock nuts 63 and 64 threaded on sections 9ª and 9ᵇ respectively, and by a washer 65. Arms 60ª of slide 60 carry guide pins 66 sliding in bores 67 in blocks 13.

A blank feed slide 68 has a lost-motion pin and slot connection 69—70 at one end with actuating slide 60, and is slidably guided in a way 71 in the same wall of the chute 8 in which plunger 48 is guided. At its opposite end slide 68 has a flat nut blank supporting lip 72 parallel with the lowermost flat side of plunger 48 and movable from a position in the nut blank passage of the chute (shown in Fig. 5) to a position out of said passage (shown in Figs. 2, 8 and 9). Lip 72 is spaced below plunger 48 exactly far enough to afford room for one nut blank between the lip and plunger with directly opposed flats of the blank respectively seated on the upper face of the lip and flush with the plane of the lowermost flat side of plunger 48. The connection between plunger 48 and slide 68 is such that lip 72 obstructs the blank passage of chute 8 whenever the plunger is retracted out of said passage, and opens said passage when the plunger obstructs the passage. This arrangement permits a chamfered blank restored to the chute to drop from between the opposed ends of plungers 48 and 57 when plunger 48 is fully retracted, and the next above unchamfered blank to drop between said plunger ends and be arrested in accurate register with the same and with the guide passage 45 of the blank holder and guide 44. It also permits this chamfered blank to drop down the chute on the next working stroke of plungers 9 and 48 on top of plunger 9 ready to drop in front of said latter plunger when the plungers are retracted.

The blades 51 are preferably confined in grooves or channels 73 of cutter 50 by blocks 74 which are detachably held in the channels 73 by screws 75. The blades 51 are endwisely adjustable and are locked in adjusted position by set screws 76. The feed chute of the known machine comprises a relatively thick member with a channel facing toward the entering end of the tap of a depth corresponding with the height of the nut blanks, i. e. the distance between the end faces of the blanks, and partly closed at its open face by two thin metal strips fastened to the channelled member to overhang the channel from opposite sides of the channel as shown. For convenience of manufacture, in the present machine the lower portion of the chute channel member is made as a separate channel section of somewhat heavier stock and has fastened thereto two short lengths of the usual thin channel overhanging metal strips, which extend from its lower end to a point just below the path of lip 72 of the feed slide, and also has guide block 44 fastened thereto across the open face of that part of its channel which extends above the path of lip 72, as clearly shown in Figs. 2, 4, 5, 8, and 9. One of said short metal strips is slotted at 78 to afford clearance for slide 68.

The chuck is provided with the usual nut positioner 12ª which is a flat tongue forming in effect an extension of one flat wall of nut passage 12 projecting beyond the entering end of said passage and having the usual serrated cam edge 12ᵇ coactive with the edge faces or sides of nuts pushed up the tap shank to partially turn the nuts on the tap to bring them into register with the entrance end of passage 12 if they are not already properly registered. The nut positioner 12ª extends through a central aperture 56 in gear 55 which aperture is preferably outwardly flared as shown but may have any other suitable size and shape permitting registering of the nuts by positioner 12ª as they approach the entering end of passage 12.

The tap 10 shown is designed for cutting the well known locking thread of Dardelet self-locking nuts, which thread, as is well known, has a conoidal crest surface of largest diameter at that side of the thread which faces toward the top or outer end of the nut, but it will be obvious that taps designed for cutting other forms of threads may be employed if desired.

While it is obvious that the machine may finish and tap blanks having a uniform cross section from end to end, it may also act on other forms of blanks such as the blanks 3 shown, which at both ends have their corners turned down slightly to present small arcuate surfaces 77, which surfaces at one end of the blank are removed by the chamfering cutter. The finished nuts thus have opposite finished ends of different forms without sharp corners, the corners of one end being chamfered as shown at 52.

What we claim is:

1. In a nut blank finishing and tapping machine, the combination of a rotary tap; means for driving said tap continuously in one direction and supporting the tap for entry of blanks thereon at one end and discharge of blanks therefrom at its opposite end; a container for nut blanks; means for automatically feeding nut blanks from said container edgewise along a fixed path one after the other to a point at which they successively register with the entering end of the tap; means for automatically pushing each blank so registered separately endwise onto the entering end of the tap; means for automatically temporarily displacing each fed blank endwise in the same direction from said fixed path at a fixed point between the container and tap; stationary means for holding a blank against rotation while so displaced; and means for automatically chamfering that end of a displaced blank which faces in the direction the blank is moved from said path while the blank is held against rotation by said stationary means.

2. In a nut blank finishing and tapping machine, the combination of a rotary tap; means for driving said tap continuously in one direction and supporting the tap for entry of blanks thereon at one end and discharge of tapped blanks therefrom at its opposite end; a container for nut blanks; means for automatically feeding nut blanks from said container edgewise along a fixed path one after the other to a point at which they successively register with the entering end of the tap; means for automatically pushing each blank so registered separately endwise onto the entering end of the tap; means actuated by said pushing means for displacing each fed blank endwise in the same direction from said fixed path at a fixed point therealong between the container and tap; stationary means for holding a blank against rotation while so displaced; means for automatically chamfering that end of a displaced blank which faces in the direction the blank is moved from said fixed path while the blank is held against rotation by said stationary means; and means for automatically pushing a blank so chamfered back into said fixed path of edgewise movement.

3. In a nut blank finishing and tapping machine, the combination of a rotary tap; means for driving said tap continuously in one direction and supporting the tap for entry of blanks thereon at one end and discharge of tapped blanks therefrom at its opposite end; a container for nut blanks; means for automatically feeding nut blanks from said container edgewise along a fixed path one after the other to a point at which they successively register with the entering end of the tap; means for automatically pushing each blank so registered separately endwise onto the entering end of the tap; means actuated by said pushing means for displacing each fed blank endwise in the same direction from said fixed path at a fixed point therealong between the container and tap; stationary means for holding a blank against rotation while so displaced; means for automatically chamfering that end of a displaced blank which faces in the direction the blank is moved from said fixed path while the blank is held against rotation by said stationary means; and means yieldably opposing the displacement of a blank by said blank displacing means for restoring a blank chamfered by the chamfering means to its fixed path of edgewise movement.

4. In an automatic nut blank finishing and tapping machine, the combination of a container for a supply of nut blanks; blank tapping mechanism; a feed chute for guiding nuts to move edgewise one after the other from the container to the tapping mechanism; means for delivering nut blanks one after the other into the feed chute from the container; reciprocatory means for periodically arresting the movement of blanks in the chute at a fixed point between the container and tapping mechanism and opening the chute for passage of blanks beyond said point; reciprocatory means for displacing the blank next above that one directly arrested by said first-mentioned reciprocatory means endwise and restoring it to the chute; an end-finishing cutting tool supported to finish one end of a blank during said endwise displacement thereof; means for rotating said cutting tool; and means for actuating both said reciprocatory means in timed relation for opening of the chute alternately at two points for passage of blanks past said means.

5. In an automatic nut blank finishing and tapping machine, the combination of a container for a supply of nut blanks; blank tapping mechanism; a feed chute for guiding nuts to move edgewise one after the other from the container to the tapping mechanism; means for delivering nut blanks one after the other into the feed chute from the container; reciprocatory means for periodically arresting the movement of blanks in the chute at a fixed point between the container and tapping mechanism and opening the chute for passage of blanks beyond said point; reciprocatory means for displacing the blank next above that one directly arrested by said first-mentioned reciprocatory means endwise and restoring it to the chute; an end-finishing cutting tool supported to finish one end of a blank during said endwise displacement thereof; driving means for rotating said tool actuated from the tapping mechanism; and driving means actuated from the tapping mechanism for operating both said reciprocatory means in timed relation to open the chute alternately at two points for passage of blanks past said means.

6. In a nut making machine, the combination of a feed chute for conveying blanks edgewise in a fixed path; stationary means associated with the chute at an intermediate point in the length of the chute for guiding a blank to move endwise from and to a fixed point in the chute and holding the blank against rotation while displaced from its path of edgewise movement; a rotary end-finishing cutter supported to rotate in a fixed path for presentation of one end of a blank thereto for cutting while held by said stationary means; and means for automatically carrying each blank entering the chute endwise a predetermined distance along said stationary guiding and holding means for cutting by said cutter and carrying it backward along the same path into the chute after end finishing thereof by the cutter.

7. In a nut making machine, the combination of a feed chute for conveying blanks edgewise in a fixed path; stationary means associated with the chute at an intermediate point in the length of the chute for guiding a blank to move endwise from and to a fixed point in the chute and holding the blank against rotation while displaced from its path of edgewise movement; a rotary end-finishing cutter supported to rotate in a fixed path for presentation of one end of a blank thereto for cutting while held by said stationary means; means for automatically carrying each blank entering the chute endwise a predetermined distance along said stationary guiding and holding means for cutting by said cutter and carrying it backward along the same path into the chute after end finishing thereof by the cutter; and means controlled by said blank-carrying means for automatically registering an unfinished blank with said carrying means and the guiding and holding means for the displaced blank when the last finished blank is restored to the chute.

8. In a nut making machine, the combination of a feed chute for conveying blanks edgewise in a fixed path; stationary means associated with the chute at an intermediate point in the length of the chute for guiding a blank to move endwise from and to a fixed point in the chute and holding the blank against rotation while displaced from its path of edgewise movement; a rotary end-finishing cutter supported to rotate in a fixed path for presentation of one end of a blank thereto for cutting while held by said stationary means; means for automatically carrying each blank entering the chute endwise a predetermined distance along said stationary guiding and holding means for cutting by said cutter and carrying it backward along the same path into the chute after end finishing thereof by the cutter; and means for automatically arresting downward movement of the last-finished and restored blank in position to support the next unfinished blank in register with the blank-carrying means and said guiding and holding means and for releasing said arrested blank during the endwise displacement of the blank so registered.

9. In an automatic nut blank finishing and tapping machine, the combination of two stationarily mounted blank holders having blank receiving passages for holding blanks for endwise movement and against rotation; a pair of rotary tools assoicated with said holders to each act upon a blank held in a different one of said holders; means for rotating said tools; means for conveying blanks edgewise past one end of one of said holders and into the other holder; devices associated with each of said holders and said conveying means for moving a blank endwise along the passage of the holder to the tool associated therewith; a device for reversely moving and restoring to said conveying means a blank moved to the tool which is associated with that holder past which the blanks are conveyed; and means for actuating said blank moving and restoring devices.

10. In a nut blank finishing and tapping machine having a tapping means including a tap, a blank holder associated with the tap, and a feed chute for conveying nut blanks edgewise in a fixed path to and into said holder, the combination with said means of a second blank holder from one end of which said chute leads to said first-mentioned holder; a rotary end finishing cutter associated with the opposite end of said second holder; and blank handling means associated with said chute for carrying one blank at a time endwise into that end of said second holder which is adjacent the chute and presenting it to the cutter and thereafter discharging it edgewise into said chute.

11. In a nut blank tapping machine, the combination of blank tapping means; means for presenting blanks to said tapping means, including a guideway along which blanks pass to said tapping means and in which blanks are held to move edgewise of the blanks; a stationary blank-holding chuck located at a side of said guideway faced by one end of blanks guided therein and having a passage opening into said way at the inner end of the chuck for receiving and holding against rotation endwisely inserted blanks; a rotatably mounted end-finishing tool having a cutting end face opposite the outer end of the chuck; means for rotating said tool; a pair of opposed plungers registering with said chuck passage; and means for actuating said plungers once for each nut tapped to grip a nut blank in said guideway between their adjacent ends and carry it first into said chuck against said tool and then carry it back into the guideway and release it.

12. A nut blank tapping machine as claimed in claim 11, having means actuated in timed relation with said plungers for insuring registry of successive blanks in said guideway with said chuck passage and said plungers.

13. In an automatic nut blank finishing and tapping machine, the combination of a container for a supply of nut blanks; power operated blank tapping mechanism; stationary means for guiding blanks edgewise one after the other through a predetermined path from the container to the tapping mechanism; power operated means for introducing blanks into said guiding means from the container; blank displacing and restoring devices automatically controlled by the tapping mechanism to reciprocate blanks endwise one at a time from the back into said path at a fixed point along the path between the container and the tapping mechanism; and a power operated rotary cutter mounted to chamfer a predetermined end of a blank upon such displacement of the blank from said path.

14. In an automatic nut blank tapping machine of the bent shank tap type having nut blank feeding and tapping means including a bent shank tap, a blank feed chute and a tapping starting plunger associated with said chute and tap, the combination with said means of a blank displacing plunger actuated by the starting plunger to move across the chute above said starting plunger in a direction to displace a blank endwise and to return to a position clear of the blank passage of the chute; stationary means associated with the chute to guide a displaced blank to move endwise under the influence of the displacing plunger and hold the displaced blank against rotation; means for reversing the endwise movement of a displaced blank and returning said blank to the blank passage of the chute; and a power driven rotary chamfering tool supported to chamfer a predetermined end of a blank while the blank is held by said stationary means.

15. In an automatic nut blank tapping machine of the bent shank tap type having nut blank feeding and tapping means including a bent shank tap, a blank feed chute, and a tapping starting plunger associated with said tap and chute, the combination with said means of a blank displacing plunger actuated by the starting plunger to move across the chute above said starting plunger in a direction to displace a blank endwise and to return to a position clear of the blank passage of the chute; stationary means associated with the chute to guide a displaced blank to move endwise under the influence of the displacing plunger and hold the displaced blank against rotation; a power driven rotary chamfering cutter supported to act upon one end of a blank while the blank is held by said stationary means; and a spring pressed blank restoring plunger mounted in and slidable axially of said rotary cutter and yieldably opposing endwise displacement of blanks by said blank displacing plunger.

16. In an automatic nut blank tapping machine of the bent shank tap type having nut blank feeding and tapping means including a bent shank tap, a blank feed chute, and a tapping starting plunger associated with said tap and chute, the combination with said means of a blank displacing plunger actuated by the starting plunger to move across the chute above said starting plunger in a direction to displace a blank endwise and to return to a position clear of the blank passage of the chute; stationary means associated with the chute to guide a displaced blank to move endwise under the influence of the displacing plunger and hold the displaced blank against rotation; a power driven rotary chamfering cutter supported to act upon one end of a blank while the blank is held by said stationary means; and means controlled by said blank displacing plunger to close the feed chute to downward passage of blanks when the chute is opened to such passage by the retraction of the blank displacing plunger, said last mentioned means being so located as to support one blank in register with both the blank displacing plunger and said stationary guiding means through the medium of but a single intervening blank.

17. In an automatic nut blank tapping machine of the bent shank tap type having nut blank feeding and tapping mechanism including a bent shank tap, a blank feed chute, a tapping starting plunger for forcing blanks discharged from said chute onto said tap, means for reciprocating said plunger, and driving means for said tap, the combination with said feeding and tapping mechanism of a rotary end finishing cutter located adjacent the chute between the entrance and discharge ends of the chute and driven by the tap driving means; and means controlled by the reciprocatory movement of the plunger for carrying each blank entering the chute to the end finishing cutter and restoring it to the chute.

18. In an automatic nut blank tapping machine of the bent shank tap type having nut blank feeding and tapping mechanism including a blank feed chute, a bent shank tap, a tapping starting plunger associated with the discharge end of said chute to force blanks successively onto the tap, and means for driving the tap and reciprocating the plunger, the combination with said mechanism of a rotary end finishing cutter located adjacent the chute between the entrance and discharge ends of the chute and rotatively driven by said driving means; stationary blank guiding and holding means associated with the chute and end finishing cutter to guide a blank endwise transversely of the chute and hold the blank against rotation with one of its ends positioned for cutting by said cutter; and means controlled by said starting plunger to carry each blank entering the chute endwise a predetermined distance along said stationary guiding and holding means and carry it backward into the chute along the same path after end finishing thereof by said cutter.

In testimony whereof we hereunto affix our signatures.

JOSEPH MERCADANTE.
ALFRED MORRIS THOMSON.